(12) United States Patent
Kochsiek

(10) Patent No.: US 6,665,936 B1
(45) Date of Patent: *Dec. 23, 2003

(54) METHOD FOR FINISHING THE BALL STAR OF A HOMOCINETIC JOINT

(75) Inventor: Guido Kochsiek, Leopoldshohe (DE)

(73) Assignee: Iprotec Maschinen-und Edelstahlprodukte GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/555,944

(22) PCT Filed: Dec. 2, 1998

(86) PCT No.: PCT/EP98/07837

§ 371 (c)(1),
(2), (4) Date: Aug. 22, 2000

(87) PCT Pub. No.: WO99/30051

PCT Pub. Date: Jun. 17, 1999

(30) Foreign Application Priority Data

Dec. 6, 1997 (EP) .............................. 97121486

(51) Int. Cl.$^7$ .............................. B21K 1/04; B21D 53/10
(52) U.S. Cl. .................. 29/898.066; 29/557; 29/558; 29/898.06; 82/1.11
(58) Field of Search .................. 29/898.063, 898.066, 29/557, 558, 898.067, 898.13; 451/52; 407/30, 34, 53; 409/131, 132; 82/120, 121, 129, 1.11

(56) References Cited

U.S. PATENT DOCUMENTS

| | | | | |
|---|---|---|---|---|
| 3,030,739 A | * | 4/1962 | Folley | |
| 3,618,191 A | * | 11/1971 | Willimek et al. | |
| 4,116,020 A | | 9/1978 | Aucktor et al. | |
| 4,437,331 A | * | 3/1984 | Dore | |
| 4,575,362 A | | 3/1986 | Girguis | |
| 4,593,444 A | * | 6/1986 | Kavthekar | |
| 4,611,373 A | * | 9/1986 | Hazebrook | |
| 4,820,240 A | * | 4/1989 | Girguis | |
| 4,861,316 A | | 8/1989 | Welschof | |
| 5,609,527 A | * | 3/1997 | Fuerstenau et al. | |
| 5,681,209 A | * | 10/1997 | Naumann et al. | |
| 6,132,316 A | * | 10/2000 | Statham | |
| 2001/0002369 A1 | * | 5/2001 | Kobayashi et al. | |

FOREIGN PATENT DOCUMENTS

| | | |
|---|---|---|
| DE | 19 25 052 U | 10/1965 |
| DE | 40 34 516 A1 | 5/1991 |
| DE | 42 12 238 A1 | 10/1993 |
| DE | 195 07 859 | 9/1996 |
| EP | 0 056 555 A1 | 7/1992 |
| WO | 92/14580 * | 9/1992 |
| WO | WO 96 386 80 A | 12/1996 |

OTHER PUBLICATIONS

Form–Dreh–Zentrum FDZ 100, pp. 14–19.
Eidesstattliche Versicherung.

* cited by examiner

Primary Examiner—Gregory Vidovich
Assistant Examiner—Eric Compton
(74) Attorney, Agent, or Firm—Cantor Colburn LLP

(57) ABSTRACT

The invention relates to a method for finishing the ball star of a homocinetic joint, especially for automobiles. The ball star has a ball ring-shaped bearing surface for mounting in a ball cage, and has a plurality of essentially axial running guideways provided for the balls. Said balls are arranged in the ball recesses of the ball cage and transmit torque between the ball cup and the ball star. In order to be able to finish such ball stars quickly, economically and as fully automatic as possible, the invention provides that both the ring-shaped bearing surface provided for mounting in the ball cage as well as guideways provided for the balls are produced by a hard-rotary turning operation.

9 Claims, 2 Drawing Sheets

METHOD FOR FINISHING THE BALL STAR OF A HOMOCINETIC JOINT

TECHNICAL FIELD

Figure 1:
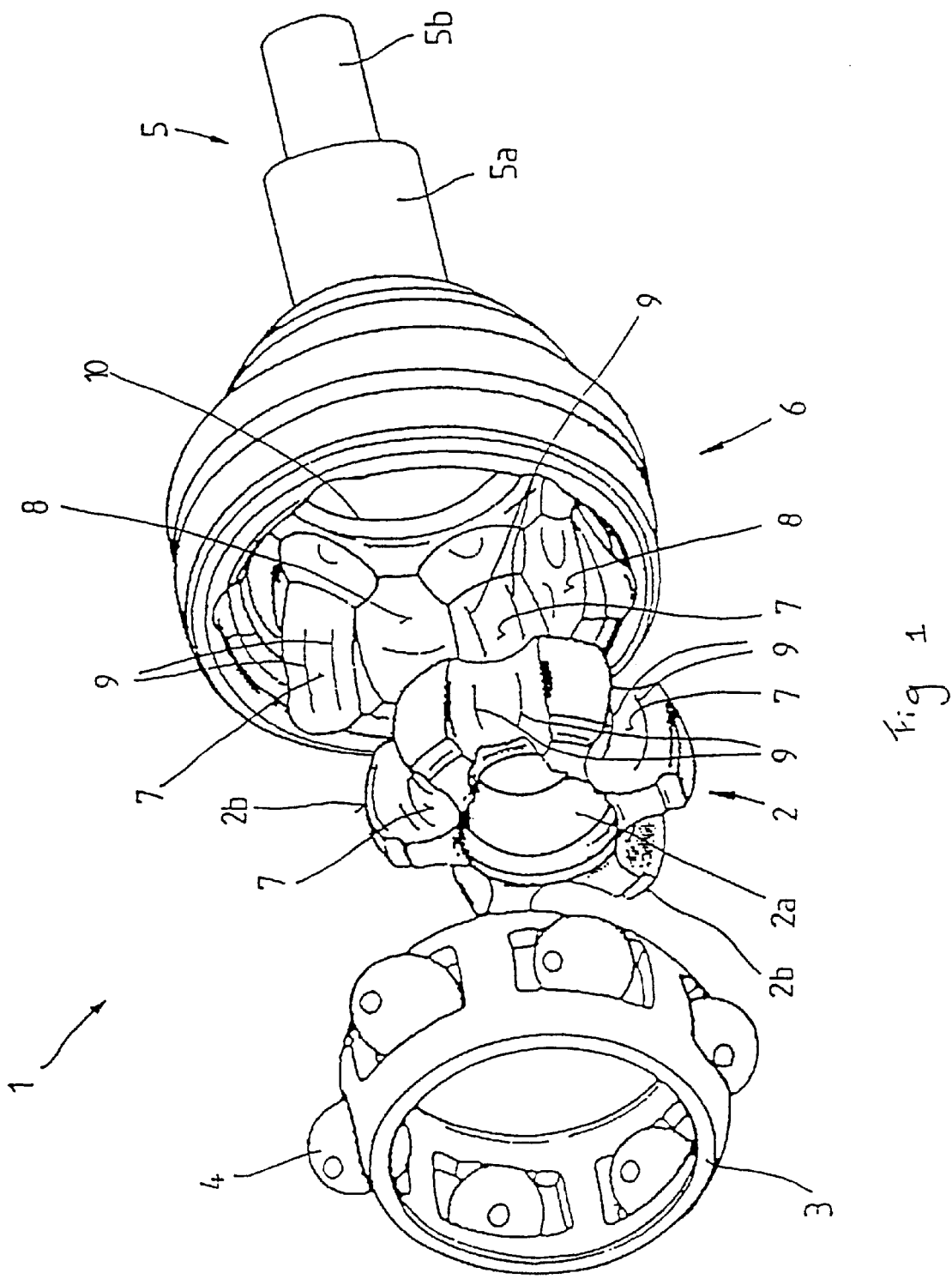

The invention concerns a process for finish-machining the bearing star of a constant-velocity joint, especially for automobiles, with a spherical bearing surface for mounting in a bearing cage and a plurality of guide tracks that basically run axially and interrupt the spherical bearing surface for the bearings arranged in the pocket of the bearing cage that transmit the torque between the bearing casing and the bearing star.

BACKGROUND OF THE INVENTION

In automobiles with front-wheel drive, the front wheels are driven by joints. Therefore, front-wheel axle shafts must have joints that allow the wheels both to spring in and out, and also to lock. Constant-velocity joints (homokinetic joints) are used to make the wheels drive as steadily as possible. Fixed constant-velocity joints designed as cap joints are used for joints on the front axle shafts, inter alia, while moving constant-velocity joints designed as cap joints are used for joints on the rear axle shafts and allow axial movement in addition to flexure of the joint.

These cap joints are comprised of a bearing star set on the wheel end of the axle shaft, on which the bearing cage with its bearings and the bearing casing connected to the wheel driveshaft sit. On a fixed constant-velocity joint, the bearing casing and the star have curved tracks on which the bearings move. On a moving constant-velocity joint, the tracks on the bearing casing and the star are designed to be even.

On the constant-velocity joints comprised of a bearing star, bearing cage and bearing casing that are known in practice, the finish-machining of the bearing casing, which has a bearing surface for mounting in a cage and guide tracks for the balls, takes a large number of different steps, which are sometimes done on different machines. Starting with a drop-forged bearing-casing blank, the known finish-machining methods produced the guide tracks by broaching and milling, while the bearing surface is produced by turning. Machining is very expensive, especially finish-machining bearing stars of fixed constant-velocity joints, because both the bearing surface and the guide tracks are designed to be curved in the axial direction of the bearing casing.

The disadvantage of this known production method is that because different machine-tooling methods are used, in which the bearing star being machined must be transformed many times and potentially fed to different machines, it is very time-consuming and hence expensive to finish-machine the bearing star. What is more, because of the various transformations, defects occur so that tolerances are only possible within certain limits.

SUMMARY OF THE INVENTION

The problem of the invention is to provide a method of finish-machining the bearing star of a constant-velocity joint so that bearing stars can be finish-machined in a simple, inexpensive way the can be fully automatated with high precision.

The invention solves this problem by producing both the spherical bearing surface for mounting in the bearing cage and the guide tracks for the bearings by a hard-rotary turning operation.

This production method in the invention makes it possible, for the first time, to make the bearing star of a constant-velocity joint by a uniform machine-tooling method, namely a turning operation method, where the turning occurs after the chucking of the blank of a bearing star. As a result of machining only by the turning operation on a machine, the method in the invention has a clear advantage in terms of time, cost and precision over the finish-machining method known in practice.

One practical embodiment of the invention proposes that the axial course of the guide tracks be designed purely spherically.

The invention also proposes that the axial course of the guide tracks be composed of a cylindrical part and a spherical part. Both sorts of bearing stars are used for fixed constant-velocity joints.

In one practical embodiment of the invention, the tangents of the balls with the accompanying guide tracks run spatially parallel to one another. In particular, the design of the spherical guide tracks also proposes that the distance between the tangents of the balls and the accompanying guide tracks change in the axial direction, which optimizes the transmission of torque.

The invention also proposes that the guide tracks can run at a sharp angle to axis of rotation of the bearing star.

One special embodiment of the invention proposes that the bearing star have a polygonal recess to connect it to the wheel driveshaft. The design of this polygonal recess for the wheel driveshaft, where the driveshaft has a corresponding polygonal contour on the outside, makes it possible to prevent any play around the bearing star/driveshaft connection, as is the case in the known state-of-the-art axial toothing.

In another advantageous embodiment of this bearing star, the polygonal recess is designed to be conical in the axial direction. This conicity of the polygonal recess permits self-centering of components being connected to one another, and no play in the bearing star/driveshaft connection in the axial and radial directions. There is also better transmission of forces, tooth effects and smaller structure.

Other features and advantages of the invention will emerge from the following description of the accompanying drawing, which shows a schematic design of a fixed constant-velocity joint with a bearing star machined according to the invention.

DETAILED DESCRIPTION OF THE INVENTION

The fixed constant-velocity joint 1 shown is comprised of a bearing star 2 set on the wheel end of the axle shaft of the driveshaft via a polygonal recess 2a, on which a bearing cage 3 with bearings 4 and a bearing casing 6 connected to a wheel driveshaft 5 sit.

On the constant-velocity joint, designed as a fixed constant-velocity joint 1, the bearing casing 6 and the bearing star 2 have spherically curved guide tracks 7, on which the bearings 4 move. The bearing casing 6 has a spherical bearing surface 8 for mounting the bearing cage 3.

In the example of embodiment shown, the tangents 9 of the bearings 1 with the accompanying guide track 7 run spatially parallel to one another on the bearing star 2 and the bearing casing 6.

In the embodiment shown, the bearing star 2 has a polygonal recess 2a to connect it to the wheel end of the axle shaft of the drive shaft into which the driveshaft, designed with a corresponding polygonal outer contour, is inserted. Unlike the axial toothing known from the state of the art, which is also possible, between the bearing star 2 and the driveshaft, this polygon connection offers the possibility of creating a connection with no play in the radial direction.

Because of the additional conical design in the axial direction of the polygonal recess 2a, on one hand and the polygonal outer contour of the driveshaft, on the other, this connection can also be made with no play in the axial direction as well.

In the example of embodiment of a fixed constant-velocity joint 1 shown, the bearing casing 6 and the wheel driveshaft 5 are designed as separate components. To connect the bearing casing 6 to the wheel driveshaft 5, there is a polygonal opening 10 in the base of the bearing casing 6, into which the wheel driveshaft 5 can be inserted, with a polygonal projection molded on accordingly. To make these adjacent polygonal surfaces self-centering, the polygonal opening 10 and the polygonal projection on the wheel driveshaft 5 are designed to be conical in the axial direction.

The part of the wheel driveshaft 5 pointing away from the bearing casing 6 is comprised of a cylindrical part 5a for the wheel bearing and a connecting part 5b to connect it to the wheel being driven. This connecting part 5b can have, for example, a polygonal outer contour or teeth on the outside.

Unlike the example of embodiment shown, it is obviously also possible to design the bearing casing 6 and the wheel driveshaft 5 as a one-piece component.

Figure 2:
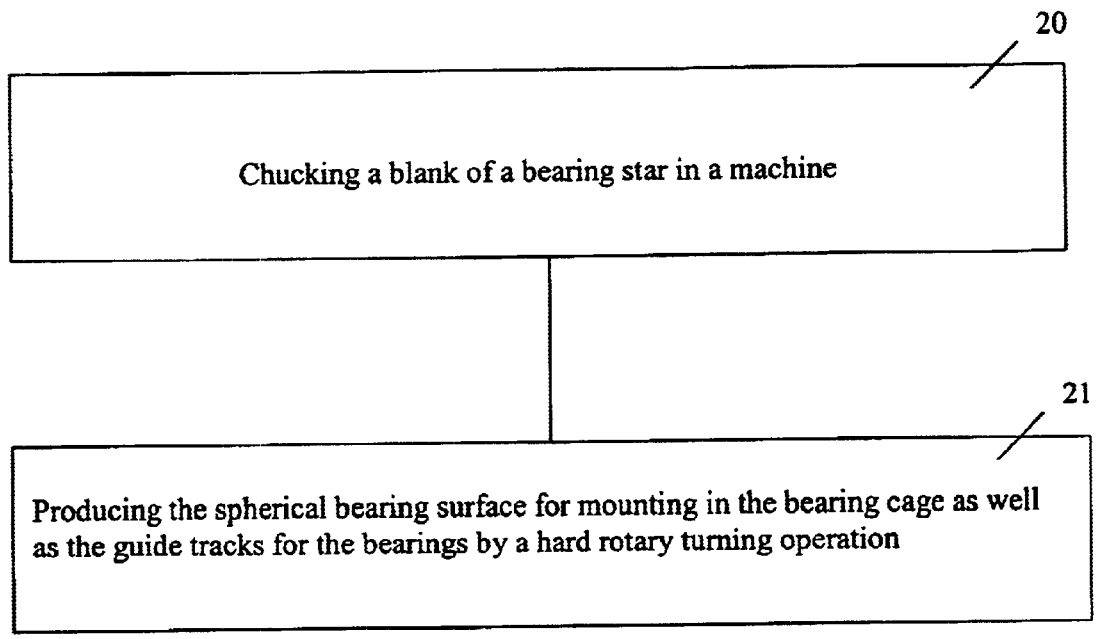

Referring to FIGS. 1–2, a method of finishing a bearing star is illustrated. The method includes chucking the blank of the bearing star 2 in a machine, which may also be known as a lathe, as represented by box 20 and producing the spherical bearing surface 8 for mounting in the bearing cage 3 as well as the guide tracks 7 for the bearings 4 by a turning operation as represented by box 21. As a result of machining only by the turning operation on a machine, the method in the invention has a clear advantage in terms of time, cost and precision over the finish-machining method known in practice.

REFERENCE LIST

1 Fixed constant-velocity joint
2 Bearing star
2a Polygonal recess
2b Bearing surface
3 Bearing cage
4 Bearing
5 Wheel driveshaft
5a Cylindrical part
5b Connecting part
6 Bearing casing
7 Guide track
8 Bearing surface
9 Tangent
10 Polygonal opening

What is claimed is:

1. A method of producing a bearing star of a constant-velocity joint, the method comprising; finish-machining by a hard-rotary turning operation with a spherical bearing surface for mounting in a bearing cage and a plurality of guide tracks that basically run axially and interrupt the spherical bearing surface, for balls arranged in bearing pockets of the bearing cage that transmit a torque between a bearing casing and the bearing star.

2. The method according to claim 1, wherein the axial course of the guide tracks is designed to be purely spherical.

3. The method according to claim 1, wherein the axial course of the guide tracks is composed of a spherical part and a cylindrical part.

4. The method according to claim 1, wherein the guide tracks run parallel axially.

5. The method according to claim 1, wherein the guide tracks run at a sharp angle to the axis of rotation of the bearing star.

6. The method according to claim 1, wherein a plurality of tangents of the bearings run parallel to one another spatially with the accompanying guide tracks.

7. The method according to claim 1, wherein a distance between a plurality of tangents of the bearings and the accompanying guide tracks changes in the axial direction.

8. The method according to claim 1, wherein the bearing star has a polygonal recess to connect it to a wheel driveshaft.

9. The method according to claim 8, wherein the polygonal recess is designed to be conical in the axial direction.

* * * * *